United States Patent [19]
Caveney

[11] 3,890,459
[45] June 17, 1975

[54] WIREWAY SYSTEM AND RETAINING FINGER FOR USE THEREIN

[75] Inventor: Jack E. Caveney, Hinsdale, Ill.

[73] Assignee: Panduit Corporation, Tinley Park, Ill.

[22] Filed: June 17, 1974

[21] Appl. No.: 479,944

[52] U.S. Cl..................... 174/101; 16/1; 174/68 C; 174/72 A; 248/68 R; 248/223; 248/361 B
[51] Int. Cl.............................................. H02G 3/04
[58] Field of Search............... 174/68 C, 72 A, 101; 317/122; 16/1; 248/73, 68 R, 223, 224, 225, 239, 243, 250, 361 B

[56] References Cited
UNITED STATES PATENTS

| | | | |
|---|---|---|---|
| 1,775,391 | 9/1930 | Fassinger | 248/243 X |
| 2,991,038 | 7/1961 | Vitiello | 248/250 X |
| 3,255,987 | 6/1966 | Gatch | 248/239 X |
| 3,485,937 | 12/1969 | Caveney | 174/72 A X |
| 3,705,949 | 12/1972 | Weiss | 174/72 A X |
| 3,826,207 | 7/1974 | Sutherlan | 248/243 X |

*Primary Examiner*—Laramie E. Askin
*Attorney, Agent, or Firm*—Charles R. Wentzel; Richard B. Wakely

[57] ABSTRACT

A wireway system for channelling, selectively routing, and retaining the various wires of a wire bundle interconnecting components of an electrical system. The wireway system comprises a channel-shaped duct for receiving the wire bundle and having an elongate base and two substantially parallel duct walls extending generally perpendicularly from the base with each of the duct walls disposed adjacent respective longitudinal edges thereof. At least one duct wall comprises at least a pair of adjacent duct fingers defining a slot permitting selective routing of various wires of the bundle. The duct fingers have distal ends which are resiliently deflectable transversely to the longitudinal direction of the base. The wireway system further includes at least one retaining finger for retaining wires within the duct and for permitting the addition of wires to the bundle. The retaining finger has a base portion for engaging the pair of duct fingers and further has a finger portion extending generally perpendicularly to the base portion. The base portion includes first and second spaced walls each having side edges and joined intermediate their respective side edges by a support so that the first and second base portion walls and the support define opposed grooves for reception of the pair of duct fingers.

13 Claims, 8 Drawing Figures

PATENTED JUN 17 1975　　3,890,459

SHEET 2

WIREWAY SYSTEM AND RETAINING FINGER FOR USE THEREIN

BACKGROUND OF THE INVENTION

This invention relates to wireway systems and more particularly to such a system including a channel-shaped duct and a retaining finger for maintaining wires within the duct.

Wireway systems including channel-shaped ducts having upstanding fingers constituting slotted side walls have come into general use in recent years because of their convenience in channelling, selectively routing and retaining the various wires of a wire bundle interconnecting the components of an electrical system. These ducts typically have a cover for retaining the wires in the duct after completion of the wiring. A problem encountered with the use of such ducts is that during the wiring or when the cover is removed to permit maintenance, individual wires may tend to fall out of the duct due to the resiliency of the wires. This problem is particularly acute when the duct is nearly filled with wires or when the duct is vertically mounted.

Because of these difficulties, plastic retaining fingers have been proposed for retaining previously installed wires in the duct until the wiring is completed and the cover mounted on the duct. These retaining fingers attach to one wall of the duct and extend partially across the duct opening. More particularily, they have a bifurcated base portion comprising resilient legs for engaging the wall and a finger portion extending from the base portion partially across the duct opening. When such a finger was attached to the sides of adjacent upstanding fingers forming a slot in the wall, the retaining finger tended to fall to the bottom of the slot where it interfered with the introduction of additional wires in the duct. This occurred because the force applied by the resilient legs slightly deflected the upstanding fingers in the longitudinal direction of the duct. To overcome this disadvantage, auxiliary closed slots for mounting the retaining fingers were required in the individual upstanding fingers. However, the closed slots typically do not extend near the top of the duct wall precluding use of the retaining finger when the duct is nearly filled with wires. The resiliency of the legs diminishes with repeated usage or when the retaining finger is subjected to heat, causing the plastic to soften, as when the wireway system is mounted on a hot control panel. Such a wireway system is shown in U.S. Pat. No. 3,705,949.

SUMMARY OF THE INVENTION

Among the several objects of this invention may be noted the provision of an improved wireway system which retains previously inserted wires in the duct and permits the introduction of additional wires therein until the wiring is completed and the duct cover mounted even if the duct is nearly full or is vertically mounted; the provision of such a system in which the retaining finger is captively held, being prevented from significant horizontal or vertical movement; the provision of such a system which avoids the necessity of providing auxiliary closed slots in the upstanding fingers constituting the walls of the duct; the provision of such a system in which the retaining finger can be easily installed and removed with one hand; and the provision of such a system which has long service life and is simple and economical to manufacture. Other objects and features will be in part apparent and in part pointed out hereinafter.

Briefly, the wireway system of the present invention includes a channel-shaped duct and a retaining finger. The duct has an elongate base and two substantially parallel duct walls extending generally perpendicularly from the base with each of the walls disposed adjacent respective longitudinal edges thereof. At least one of the duct walls includes a pair of adjacent duct fingers which define a slot permitting selective routing of wires of the bundle. The fingers have distal ends which are resiliently deflectable transversely to the longitudinal direction of the base. The retaining finger includes a base portion and a finger portion extending generally perpendicularly from the base portion. The base portion has first and second walls each having side edges and joined intermediate their respective side edges by a support, with the walls and the support defining opposed grooves. The retaining finger is mountable on the duct by deflecting at least one of the pair of duct fingers transversely to the longitudinal direction of the duct, positioning the undeflected duct finger in one of the grooves, positioning the deflected duct finger in the other of the grooves, and returning the deflected duct finger to its undeflected position.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
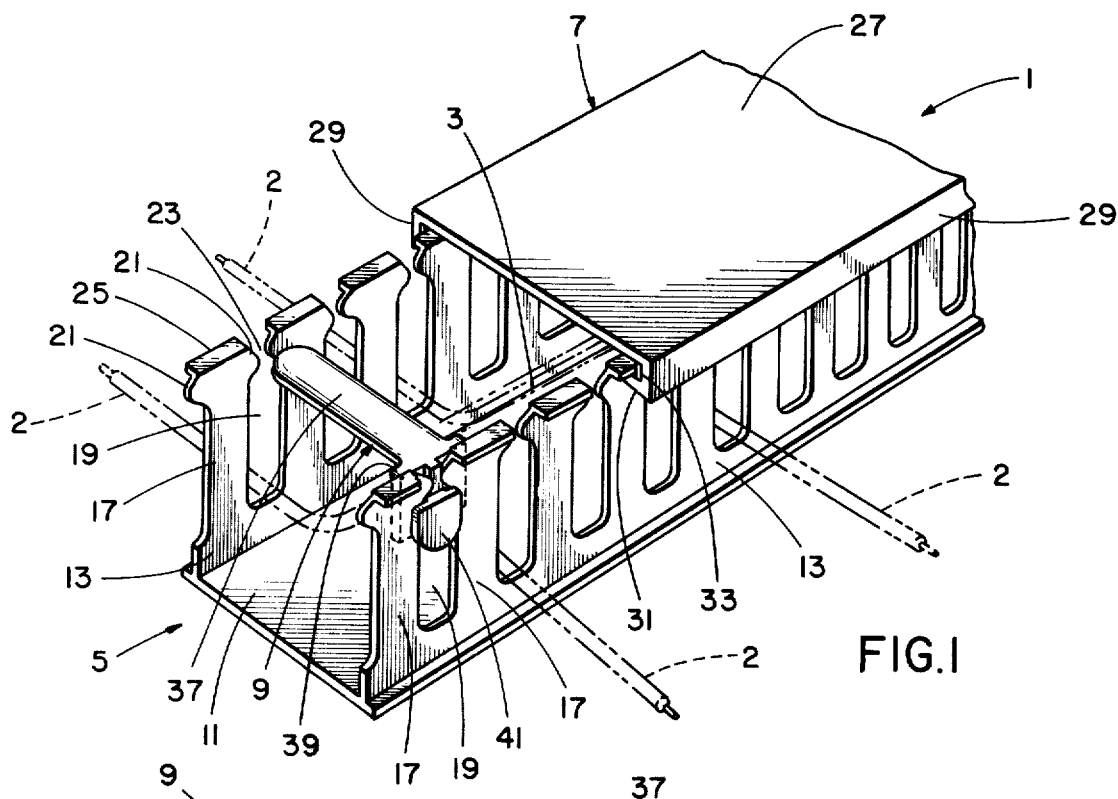
FIG. 1 is a perspective of a wireway system of the present invention.

Referring now to FIG. 1 of the drawings, a wireway system of the present invention for channelling, selectively routing and retaining the various wires 2 of a wire bundle 3 interconnecting components of an electrical system is generally indicated by reference numeral 1. It is to be understood that the term wire bundle is used in its broad sense and includes any grouping of wires whether or not the wires are bound together as by strings or straps. Wireway system 1 comprises a channel-shaped duct 5 for receiving the wire bundle, a cover 7 for more or less permanently closing the duct after completion of the wiring, and one or more retaining fingers 9 for retaining wires 2 within the duct and for permitting the addition of wires into the duct. Channel-shaped duct includes one piece duct and modular duct, the latter of which, after assembly, is channel-shaped.

Hardware for mounting wireway system 1 on a panelboard or the like is not shown.

More particularly, duct 5 includes an elongate base 11 and two substantially parallel duct walls 13 extending generally perpendicularly from the base with each of the walls 13 disposed adjacent respective longitudinal edges thereof. At least one of the duct walls 13 comprises at least a pair of adjacent duct fingers 17 which define a slot 19 permitting selective routing of various wires of bundle 3. Each duct finger 17 has a pair of ears 21 extending oppositely in the longitudinal direction of duct 5 with adjacent ears of adjacent duct fingers defining a constricted throat 23 to a corresponding slot 19 defined by the adjacent fingers 17. The width of throat 23 is preferably less than the diameter of a wire 2 to prevent egress of a wire previously inserted in a slot 19. Duct fingers 17 have distal ends which are resiliently deflectable transversely to the longitudinal direction of base 11 and wires are routed through the slots by deflecting a finger 17 until the corresponding throat 23 opens sufficiently to permit passage of the wire. The distal end of each of the fingers 17 carries a holding flange 25 extending laterally outwardly from duct 5 for securing cover 7 in place.

Cover 7 includes a generally rectangular main wall 27 sized to overlie base 11 of duct 5. The longitudinally extending edges of main wall 27 carry substantially parallel side flanges 29, respectively, extending longitudinally thereof. Each side flange 29 has a retaining flange 31 extending toward the opposite side flange. Strips 33 of resilient material are provided which extend along the inner surfaces of side flanges 29. These strips tend to prevent longitudinal movement of cover 7 relative to duct 5. Cover 7 may either be slid into position from one end of duct 5 or may be placed in position by engaging one of the retaining flanges 31 under the holding flanges 25 of one wall 13 of the duct and then deflecting the duct fingers 17 constituting the other wall 13 of the duct inwardly to permit cover 7 to be positioned. The release of the deflected duct fingers 17 permits them to move into a position engaging the other retaining flange 31. Duct 5 and cover 7 are more completely described and illustrated in commonly assigned U.S. Pat. No. 3,485,937.

Figure 2:
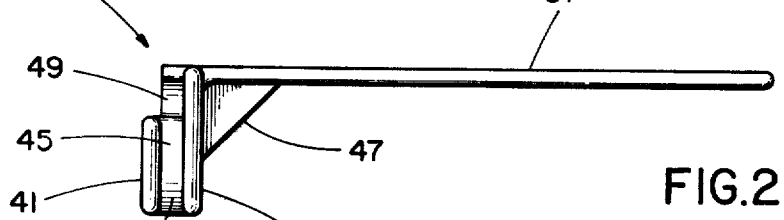
FIG. 2 is a side elevation of a retaining finger used in the wireway system of FIG. 1.
Figure 3:
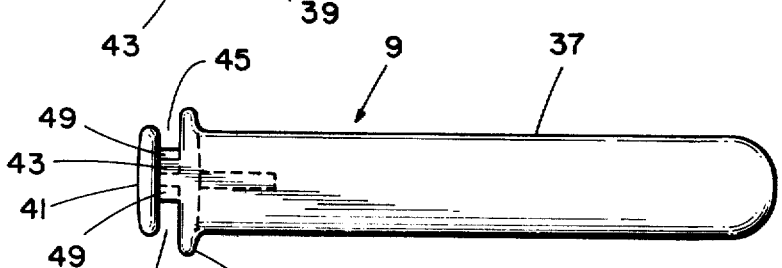
FIG. 3 is a plan of the retaining finger of FIG. 2.
Figures 4, 5:
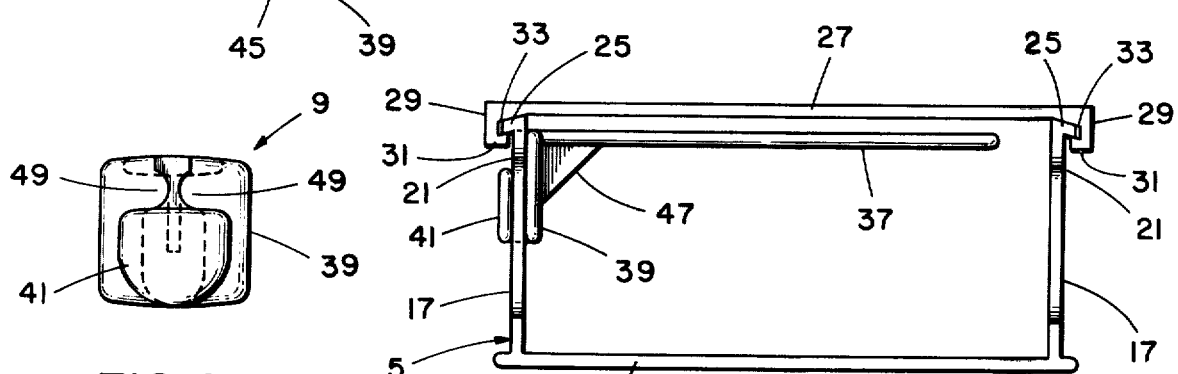
FIG. 4 is a front elevation of the retaining finger of FIG. 2.
FIG. 5 is an end elevation of the wireway system of FIG. 1.

The retaining finger 9 for retaining wires in duct 5 and permitting the introduction of additional wires into the duct is best shown in FIGS. 2-4 and is preferably of one-piece molded plastic construction. Retaining finger 9 comprises a base portion for engaging a pair of adjacent duct fingers 17 in one of the duct walls 13 and a finger portion 37 extending generally perpendicularly to the base portion. Finger portion 37 is preferably somewhat shorter than the spacing between duct walls 13. The base portion includes first and second spaced walls 39, 41, respectively, each having side edges and joined intermediate their side edges by a support 43. Wall 39 is disposed between duct walls 13 when finger 9 is mounted. Walls 39, 41 and support 43 define opposed grooves 45 for reception of adjacent duct fingers 17 thereby to captively hold retaining finger 9 therebetween. The longitudinal extension of walls 39, 41 relative to duct 5 is sufficient to overlap adjacent duct fingers 17 and the spacing between walls 39, 41 is preferably at least equal to the thickness of duct fingers 17. However, the side edges of walls 39, 41 could be spaced less than the thickness of the duct fingers and could be resiliently deflectable transversely to the longitudinal direction of duct 5 to allow duct fingers 17 to be received between walls 38, 41.

More particularly, finger portion 37 extends in cantilever fashion from wall 39 with the two joined by a stiffening rib 47. The sides of vertical support 43 each have an opposed discontinuity 49 adjacent finger portion 37 for receiving the adjacent ears 21 of adjacent duct fingers 17. Each discontinuity has opposed surfaces constituting abutments for engaging an ear 21 to prevent sliding of retaining finger 9 relative to duct 5. The opposed surfaces of the discontinuity preferably form a continuous curved surface having a curvature similar to the curvature of ears 21 so that the ear nests within discontinuity 49 and so that the surfaces defining the discontinuity engage a large portion of the periphery of a corresponding ear 21. As shown in the drawings, retaining finger 9 is generally symmetrical about a plane. Preferably wall 41 does not overlap discontinuities 49 to allow convenient installation of the retaining finger.

Figure 6:
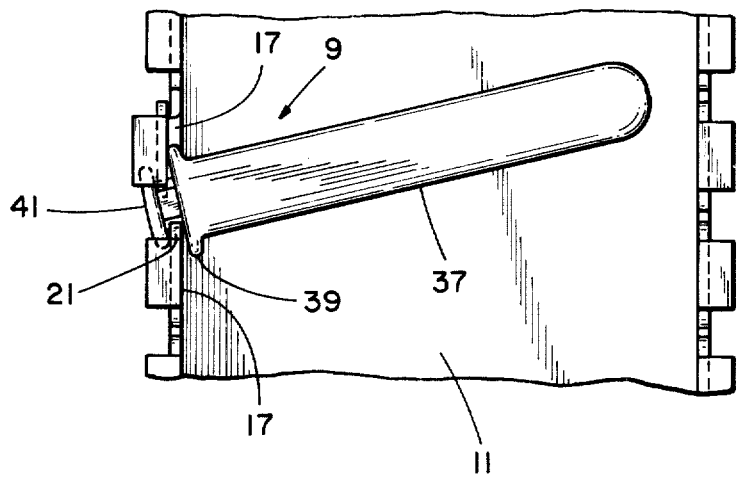
FIG. 6 is a partial plan of the wireway system of FIG. 1 showing one of a pair of adjacent duct fingers deflected to permit mounting of the retaining finger.
Figure 7:
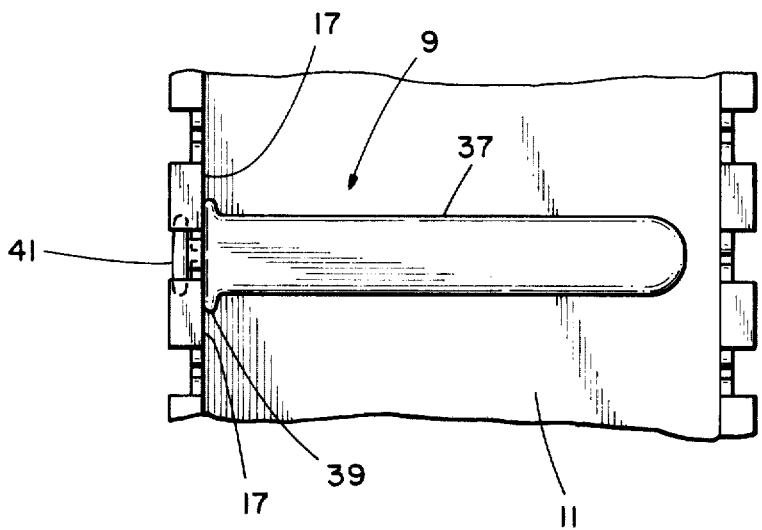
FIG. 7 is similar to FIG. 6 and shows the retaining finger mounted with the deflected duct finger returned to its undeflected position.

As shown in FIGS. 6, 7, retaining finger 9 can conveniently be installed on duct 5 with one hand by deflecting one of a pair of adjacent duct fingers 17 transversely to the longitudinal direction of the duct, positioning the undeflected duct finger 17 in one of grooves 45 so that the corresponding ear 21 of that finger is received within the corresponding discontinuity 49, similarly positioning the deflected duct finger 17 in the other groove 45, and returning the deflected duct finger to its undeflected position. Finger 9 can be removed from duct 5 by reversing the above described steps. It is to be understood that the above described method is merely one way of mounting the retaining finger. So mounted, retaining finger 9 is captively held by adjacent duct fingers 17 within the associated slot 19 with finger portion 37 extending partially across base 11 of duct 5. Retaining finger 9 is prevented from significant movement transversely to duct 5 because walls 39, 41 overlap and interfere with the adjacent fingers 17. Finger 9 is similarly prevented from sliding relative to duct 5, as the opposed surfaces of discontinuities 49 abut associated ears 21 of the duct fingers 17. The space between finger portion 37 and opposite duct wall 13 permits additional wires to be inserted into the duct while finger portion 37 prevents previously inserted wires from falling out of duct 5 or extending out of the duct. As the maximum extension of the mounted retaining finger 9 is somewhat removed from retaining flanges 25 of the duct fingers 17, retaining finger 9 in no way interferes with the installation of cover 7. If sliding of retaining finger 9 relative to duct 5 is desired, finger 9 can be mounted as above described except with the discontinuities 49 of finger 9 disposed between base 11 and ears 21.

Although both duct walls 13 of duct 5 are shown being of open slot construction, it is to be understood that one duct wall 13 could be of closed slot construction.

Figure 8:
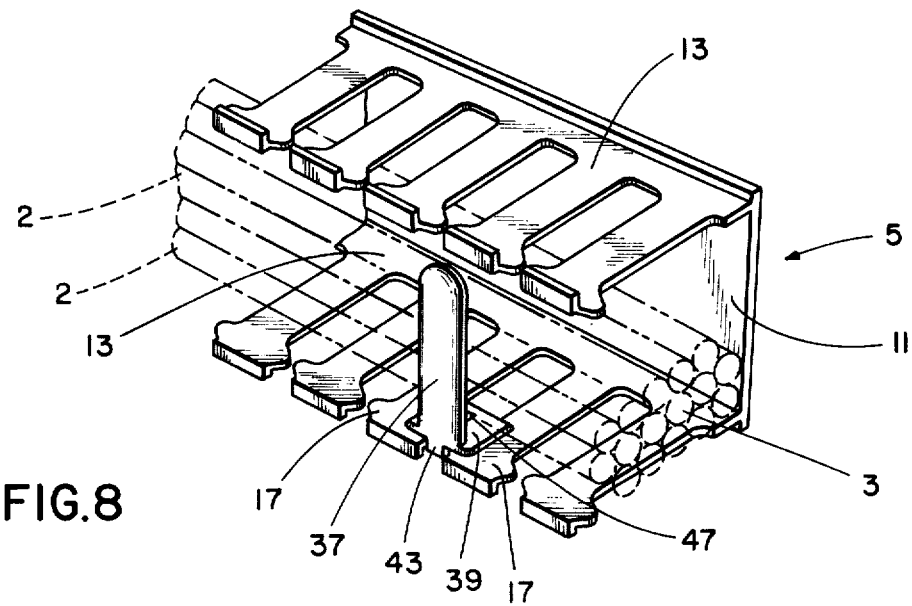
FIG. 8 is a perspective showing vertical mounting of the wireway system of FIG. 1.

As shown in FIG. 8, wireway system 1 is also suited for vertical mounting. With retaining finger 9 extending from the lower duct wall 13, wires 2 may be added to duct 5 by inserting them between the distal end of finger portion 37 and upper duct wall 13. Since previously inserted wires 2 are gravity biased to positions adjacent lower duct wall 13, finger portion 37 prevents such wires from falling out of duct 5.

In view of the above, it will be seen that several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A wireway system for channelling, selectively routing and retaining the various wires of a wire bundle interconnecting components of an electrical system, said wireway system comprising:

a channel-shaped duct for receiving the wire bundle and having an elongate base and two substantially parallel duct walls extending generally perpendicularly from said base with each of the walls disposed adjacent respective longitudinal edges thereof, at least one of said duct walls comprising at least a pair of adjacent duct fingers which define a slot permitting selective routing of various wires of said bundle, said duct fingers having distal ends which are resiliently deflectable transversely to the longitudinal direction of said base, one finger having an ear adjacent its distal end extending toward the other finger to define a restricted throat to said slot; and at least one retaining finger for retaining wires within the duct and for permitting the addition of wires to said bundle, said retaining finger having a base portion engaging said pair of adjacent duct fingers and further having a finger portion extending generally perpendicularly to said base portion, said base portion comprising first and second spaced walls joined by a support, said first and second spaced walls and said support defining opposed grooves for reception of said pair of adjacent duct fingers, the longitudinal extension of the first and second spaced walls relative to said duct being sufficient to overlap said adjacent duct fingers, said base portion including an abutment surface engaging said ear to hold the base portion adjacent the distal end of said one finger, said retaining finger being mounted on said duct with the first of the spaced walls disposed between the duct walls whereby the retaining finger is captively held by said duct fingers with the first and second spaced walls of said base portion preventing significant movement of said retaining finger transversely of said duct and with the finger portion extending at least partially across the base of said duct to retain wires in said duct while permitting the insertion of additional wires into the duct.

2. A wireway system as set forth in claim 1 wherein at least one side of the support of the retaining finger has a discontinuity having opposed surfaces constituting abutments engaging said ear thereby preventing sliding of the retaining finger relative to the duct, one of said opposed surfaces constituting said abutment surface. slot and further wherein the sides of said support each have an opposed discontinuity, each discontinuity having opposed surfaces constituting abutments engaging the ear of a corresponding duct finger, one of said opposed surfaces constituting said abutment surface.

3. A wireway system as set forth in claim 2 further comprising a cover on said duct and wherein said duct fingers have means at their distal ends holding said cover in place and wherein the maximum extension of the mounted retaining finger is somewhat removed from said holding means so that the retaining finger does not interfere with the installation of said cover.

4. A wireway system as set forth in claim 2 wherein said discontinuity is adjacent said finger portion.

5. A wireway system as set forth in claim 4 wherein the second spaced wall of the base portion does not overlap said discontinuity.

6. A wireway system as set forth in claim 1 wherein each of said duct fingers has an ear adjacent its distal end extending oppositely in the longitudinal direction of the duct and defining a constricted throat to the slot and further wherein the sides of said support each have an opposed discontinuity, each discontinuity having opposed surfaces constituting abutments engaging the ear of a corresponding duct finger, one of said opposed surfaces constituting said abutment surface.

7. A wireway system as set forth in claim 1 wherein said finger portion extends from said first spaced wall of the retaining finger.

8. A wireway system as set forth in claim 7 wherein said retaining finger further comprises a stiffening rib joining said first spaced wall and said finger portion.

9. A wireway system as set forth in claim 1 wherein said retaining finger is of one-piece, molded construction.

10. A wireway system as set forth in claim 1 wherein said retaining finger is symmetrical about a plane.

11. A wireway system as set forth in claim 1 in which the finger portion of said retaining finger is somewhat shorter in length than the distance between said duct walls.

12. A retaining finger comprising:

a base portion including first and second spaced walls joined by a support to define opposed grooves with one side of said support including a discontinuity constituting abutment means; and a finger portion extending generally perpendicularly from said base portion whereby said finger is adapted to be mounted on a flexible wall having at least one open-ended slot with an ear extending into the slot and engagable by a surface of said discontinuity.

13. A retaining finger as set forth in claim 12 wherein said discontinuity has opposed surfaces constituting abutments.

* * * * *

UNITED STATES PATENT AND TRADEMARK OFFICE
CERTIFICATE OF CORRECTION

PATENT NO. : 3,890,459
DATED : June 17, 1975
INVENTOR(S) : Jack E. Caveney

It is certified that error appears in the above-identified patent and that said Letters Patent are hereby corrected as shown below:

Column 2, line 17: insert --spaced-- after "second";

Column 4, line 2: "38" should be --39--;

Column 6, lines 2-7: delete "slot and further wherein the sides of said support each have an opposed discontinuity, each discontinuity having opposed surfaces constituting abutments engaging the ear of a corresponding duct finger, one of said opposed surfaces constituting said abutment surface.".

Signed and Sealed this thirteenth Day of April 1976

[SEAL]

Attest:

RUTH C. MASON
*Attesting Officer*

C. MARSHALL DANN
*Commissioner of Patents and Trademarks*